United States Patent

Glitho et al.

[11] Patent Number: 5,991,803
[45] Date of Patent: Nov. 23, 1999

[54] DECOUPLING SERVICE CREATION ENVIRONMENT FROM SERVICE LOGIC EXECUTION ENVIRONMENT

[75] Inventors: Roch Glitho, Montreal; Patricia Funnell, Pointe Claire, both of Canada

[73] Assignee: Telefonaktiebolaget LM Ericsson (publ), Stockholm, Sweden

[21] Appl. No.: 08/961,510

[22] Filed: Oct. 30, 1997

Related U.S. Application Data

[60] Provisional application No. 60/042,082, Mar. 28, 1997.

[51] Int. Cl.$^6$ ........................................................ G06F 13/00
[52] U.S. Cl. ........................ 709/220; 709/225; 709/228; 709/300; 395/707
[58] Field of Search ................................... 709/201, 202, 709/220, 222, 223, 224, 225, 226, 228, 300, 303, 304, 305; 395/701, 705, 707; 379/201, 207

[56] References Cited

U.S. PATENT DOCUMENTS

| | | | |
|---|---|---|---|
| 5,455,853 | 10/1995 | Cebulka et al. | 379/201 |
| 5,488,569 | 1/1996 | Kaplan et al. | 709/228 |
| 5,517,562 | 5/1996 | McConnell | 379/207 |

FOREIGN PATENT DOCUMENTS

| | | |
|---|---|---|
| 0 663 750 | 12/1994 | European Pat. Off. |
| WO 94/05112 | 3/1994 | WIPO |

OTHER PUBLICATIONS

PCT International Search Report, Nov. 24, 1998, PCT/SE 98/00428.

Sakai, et al., "A Service Logic Program Generation Method for Advanced Intelligent Network", IEEE International Conference on Communications, Jun. 23, 1996, pp. 47–51.

Ohara, "Evaluation of the Service Execution Environment & The Service Development Environment for AIN", IEEE Global Telecommunications Conference, Dec. 6, 1992, pp. 549–553.

Primary Examiner—Viet D. Vu
Attorney, Agent, or Firm—Jenkens & Gilchrist PC

[57] ABSTRACT

A service creation environment (SCE) generates generic service creation information defining a certain service. The generic service creation information is then processed by a service execution agent for mapping onto service creation information that is specific to the service logic execution environment (SLEE) of a service control point (SCP) upon which the service is to be executed and provided. This SLEE specific service creation information is then down-loaded to the service logic execution environment, and converted in a conventional manner to service execution related information. The generic service creation information comprises only a certain limited number of primitives (instructions or commands) operating on a certain limited number of service independent building blocks (SIBs). The mapping operation is made from these limited primitives and service independent building blocks to SLEE specific primitives and service independent building blocks, or SLEE specific general programming language commands, or SLEE specific specification description language (SDL) commands.

12 Claims, 1 Drawing Sheet

DECOUPLING SERVICE CREATION ENVIRONMENT FROM SERVICE LOGIC EXECUTION ENVIRONMENT

CROSS-REFERENCE TO RELATED APPLICATION

The present application claims priority from, and also incorporates by reference, previously filed, U.S. Provisional Application for Patent Ser. No. 60/42,082 filed Mar. 28, 1997, now abandoned and entitled "Decoupling Service Creation and Service Logic Execution Environment", by Roch Glitho, et al.

BACKGROUND OF THE INVENTION

1. Technical Field of the Invention

The present invention relates to the creation and provisioning of special intelligent network telephone services.

2. Description of Related Art

Telephone service providers are constantly developing new telephone services to meet the needs of existing customers, and further to attract new customers. It is important then that service providers be able to create and deploy these services as quickly and efficiently as possible. Services are typically created using a service creation environment (SCE). These created services are then executed by a service logic execution environment (SLEE) after being deployed into a given communications network. In an intelligent network (IN), for example, the service logic execution environment often sits in a service control point (SCP) node.

Conventional telephone service development generally has the service creation environment generate commands relating to the created service that are specific (i.e., custom tailored) to the service control point, and its associated service logic execution environment, upon which the service is to be executed. Once downloaded to that specific service control point, the commands trigger the building of service scripts. The scripts are then executed by the service logic execution environment included within that service control point to provide the telephone service.

This conventional approach to service creation and provisioning has a number of limitations. The most restrictive of those limitations is that in selecting a certain service creation environment to create a given service, a corresponding service logic execution environment must be used to execute the service. Thus, it is noted that the service creation environment and the service logic execution environment for a given telephone service are tightly coupled. The service logic execution environment corresponding to the service creation environment used in developing the service must then be implemented in the service control point through which the service is being provisioned. Furthermore, with this tightly coupled relationship, it is not possible to use the same service creation environment to design services for implementation on different service logic execution environments. Also, it is not possible to use different service creation environments to design services for the same service logic execution environment.

It is recognized then that this tightly coupled limitation of the prior art service creation and provisioning process may require, in situations where a given service is to be provided on different types of service control point platforms each having a different service logic execution environment, the use of two or more different service creation environments in creating that service for widespread network installation. As the creation and deployment of a single service may require the application of a significant amount of time and effort, it is unproductive and inefficient to expend that effort two or more times to provide the same service for execution on multiple different service logic execution environments. This is especially a concern to the service provider when it utilizes different vendors to supply service control points for its intelligent network, as a different service creation environment may be required for each different service control point upon which the service must be provided. For the service creator, there are also concerns over redundant service development and possible inconsistencies in the plural created services. There is a need then for a technique that supports the de-coupling of the service creation environment from the service logic execution environment. This technique would efficiently allow for the use of any selected service creation environment to develop telephone services for execution on a service control point by any selected service logic execution environment.

SUMMARY OF THE INVENTION

Rather than have service creation environments (SCEs) generate service creation information that is specific (i.e., tightly coupled) to a associated certain service logic execution environment (SLEE), the service creation environment of the present invention instead generates generic service creation information defining a certain service. This generic service creation information comprises only a certain limited number of primitives (instructions or commands) operating on a certain limited number of service independent building blocks (SIBs) to define the service. A service execution agent receives the generic service creation information for the certain service and maps it onto service creation information that is specific to the service logic execution environment of a service control point upon which the service is to be executed and provided. This service logic execution environment specific service creation information is then down-loaded to the service logic execution environment, and converted in a conventional manner to service execution related information for execution.

The mapping function implemented by the service execution agent operates in one of a number of different ways. In a first implementation, the service execution agent receives the generic service creation information from the service creation environment, and interprets the defined primitives selectively operating on the service independent building blocks to identify corresponding service logic execution environment specific primitives and service independent building blocks (i.e., SLEE specific service creation information) for the certain service control point (SCP) upon which the service is to be provided. For the second implementation, the service execution agent receives the generic service creation information from the service creation environment, and interprets the defined primitives selectively operating on the service independent building blocks to identify corresponding SLEE specific service creation information general programming language commands for the certain service control point upon which the service is to be provided. Furthermore, in a third implementation, the service execution agent receives the generic service creation information from the service creation environment, and interprets the defined primitives selectively operating on the service independent building blocks to identify corresponding SLEE specific service creation information specification description language (SDL) commands for the certain service control point upon which the service is to be provided.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
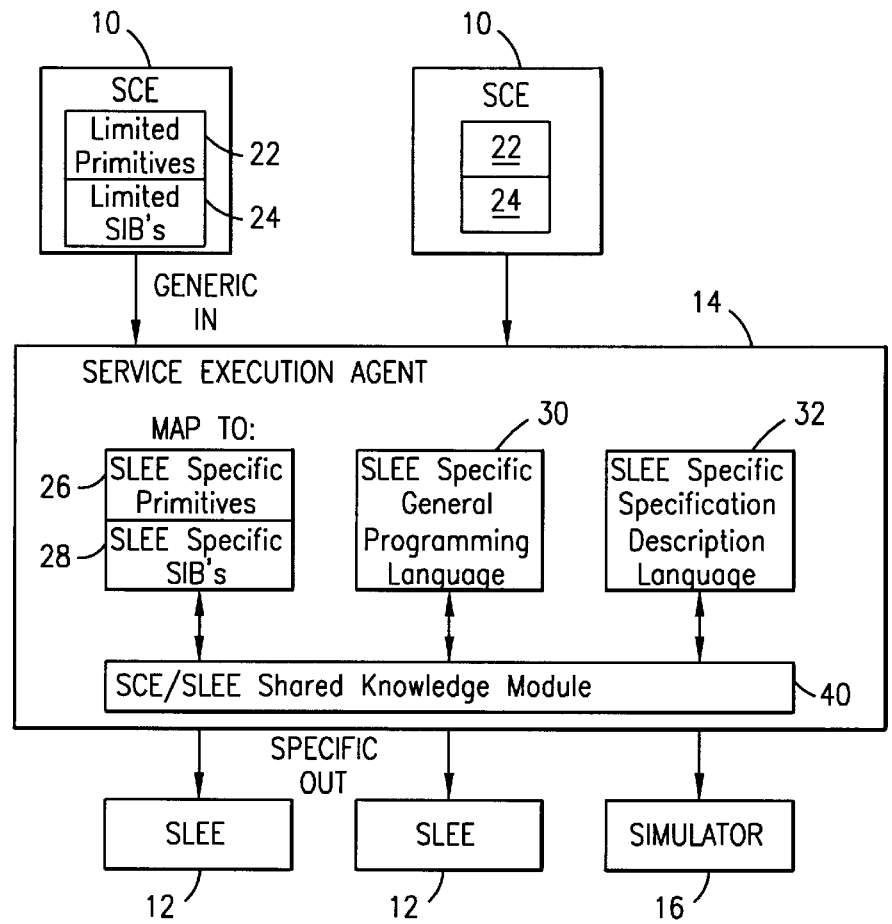
FIG. 1 is a block diagram of a decoupled service creation environment and service logic execution environment architecture of the present invention.

Reference is now made to FIG. 1 wherein there is shown a block diagram of a decoupled service creation environment and service logic execution environment architecture of the present invention. In accordance with the technique of the present invention, a number of different service creation environments (SCEs) 10 are supported. Furthermore, a number of different service logic execution environments (SLEES) 12 are supported. In accordance with the present invention, any selected one of the service creation environments 10 may be used to create a telephone service for execution on any selected one of the service logic execution environments 12. To support this architecture, the present invention further includes a service execution agent 14 comprising an abstract service machine. The service execution agent 14 functions in its most basic sense to map generic service creation information generated by a given service creation environment 10 for a certain service to service creation information specific to the particular one of the service logic execution environments 12 upon which the certain service is to be provided. This SLEE specific service creation information is then down-loaded to that particular service logic execution environment 12 and converted to service related execution information executable by that particular service logic execution environment in providing that certain service. To accomplish this mapping function, the service execution agent 14 receives generic service creation information output from a given service creation environment 10 comprising logic that describes the certain service plus supporting data. This received generic service creation output is preferably in a generic and service logic execution environment/service control point independent format. Responsive to the received generic service creation information output in the generic format, the service execution agent 14 converts the service related creation information to service logic execution environment 12 specific service creation information in one of several different formats. Conversion of the SLEE specific service creation information to service execution related information is then made in a conventional manner by the service logic execution environment 12 itself.

The architecture of the present invention further supports the use of a simulator 16 for simulating execution of created services prior to deployment on a service control point 18 for execution by an associated service logic execution environment 12. In this regard, any selected one of the service creation environments 10 may be used to create a service for simulation. The service execution agent 14 again functions to map generic service creation information generated by a given service creation environment 10 for a certain service to service creation information specific to the particular one of the service logic execution environments 12 upon which the certain service is proposed to be provided. This SLEE specific service creation information is then down-loaded to the simulator 16 for that proposed destination service logic execution environment and converted to service related execution information executable by that simulator in simulating the provision of that certain service. To accomplish this mapping function, the service execution agent 14 receives generic service creation information output from a given service creation environment 10 comprising logic that describes the certain service plus supporting data. This generic service creation information output is preferably in a generic and service logic execution environment/service control point independent format. Responsive to the received generic service creation information output in the generic format, the service execution agent 14 converts the generic service creation information to service logic execution environment 12 specific service creation information in one of several different formats for the simulator 16. Conversion of the SLEE specific service creation information to service execution related information is then made in a conventional manner by the simulator 16 itself.

In generating the generic service creation information for the certain service, the service creation environment 10 may utilize only a certain limited number of primitives 22 in connection with a certain limited number of service independent building blocks (SIBs) 24. The primitives 22 comprise orders (commands or instructions) that operate on the service independent building blocks 24 to create service logic. These primitives 22 are taken from a larger primitive collection commonly utilized for service creation, and fall generally into three categories: instantiation primitives, primitives for interconnecting SIBs, and primitives to add data or data parameters. Examples of instantiation primitives comprise: start a service logic, end a service logic, and initialize a SIB. An example of a primitive to interconnect SIBs comprises: connect SIB 1 to SIB 2. Examples, of primitives which add data or data parameters comprise: initialize data, connect data to SIB, and connect data parameter to SIB. The service independent building blocks 24 comprise descriptions of basic functions, where any service may be defined (to create service logic) by appropriately having the primitives 22 operate in a certain order and on certain ones of the blocks. The service independent building blocks 24 utilized herein are taken from a larger SIB collection defined by the International Telecommunications Union (ITU-T), and comprise the following thirteen blocks: algorithm, charge, compare, distribution, limit, log call information, queue, screen, service data management, status notification, translate, user interaction, and verify (see, ITU-T Recommendation Q.1213 (March 1993). The generic service creation information generated by any selected service creation environment 10 for the certain service accordingly comprises use of certain ones of the set of allowed primitives 22 selectively operating on certain ones of the limited number of service independent building blocks 24. It is the data and data parameters, as well as the topology of the SIB interconnection (as defined by the primitives), which adds a service dependance element necessary for service creation.

The mapping function implemented by the service execution agent 14 operates in one of a number of different ways. In a first implementation, the service execution agent 14 receives the generic service creation information from the service creation environment 10, and interprets the defined primitives 22 selectively operating on the service independent building blocks 24 to identify corresponding service logic execution environment specific primitives 26 and service independent building blocks 28 (i.e., SLEE specific service creation information) for the certain service control point 18 upon which the service is to be provided. As an example of this, consider a service creation environment 10 generated generic service creation information comprising "Connect (primitive 22) SIBs 1, 2, 3 and 4 (service independent building blocks 24)". The mapping function implemented by the service execution agent 14 operates in the first implementation to recognize the generated generic service creation information as being equivalent to the SLEE specific service creation information comprising, for example, "Connect (primitive 26) SIBs A and B (service independent building blocks 28)". Again, it should be recognized that the mapping function generates service logic execution environment specific service creation information. Thus, for another, different service logic execution environment 12, that same received generic service creation information is mapped to SLEE specific service creation information comprising, for example, "Connect (primitive 26) SIBs 157 and 54 (service independent building blocks 28)".

In connection with a second implementation, it is recognized that certain service logic execution environments 12 do not utilize primitives 26 and service independent building blocks 28 to implement services. Rather, these service logic execution environments 12 may make use of a general programming language (such a JAVA or C++) to define and implement their services. The service execution agent 14 receives the generic service creation information from the service creation environment 10, and interprets the defined primitives 22 selectively operating on the service independent building blocks 24 to identify corresponding service logic execution environment specific general programming language commands 30 for the certain service control point 18 upon which the service is to be provided. Consideration is again given to the example service creation environment 10 generated generic service creation information comprising "Connect (primitive 22) SIBs 1, 2, 3 and 4 (service independent building blocks 24)". The mapping function implemented by the service execution agent 14 operates in the second implementation to recognize the generated generic service creation information as being equivalent to the SLEE specific service creation information, general programming language command (instruction). Again, the mapping function generates service logic execution environment specific service creation information and, thus, a different general programming language command may be produced through mapping for another, different service logic execution environment 12 from that same received generic service creation information.

In connection with a third implementation, it is recognized that certain service logic execution environments 12 do not utilize either primitives 26 and service independent building blocks 28 or a general programming language (such a JAVA or C++) to implement services. Rather, these service logic execution environments 12 may use of specification description language (SDL) to define and implement their services. The service execution agent 14 receives the generic service creation information from the service creation environment 10, and interprets the defined primitives 22 selectively operating on the service independent building blocks 24 to identify corresponding service logic execution environment specific specification description language commands 32 for the certain service control point 18 upon which the service is to be provided. Consideration is again given to the example service creation environment 10 generated service creation information comprising "Connect (primitive 22) SIBs 1, 2, 3 and 4 (service independent building blocks 24)". The mapping function implemented by the service execution agent 14 operates in the third implementation to recognize the generated generic service creation information as being equivalent to the SLEE specific service creation information, specification description language command (instruction). Again, the mapping function generates service logic execution environment specific service creation information and, thus, a different specification description language command may be produced through mapping for another, different service logic execution environment 12 from that same received generic service creation information.

To assist in implementing the mapping function, the service execution agent 14 includes an SCE/SLEE shared knowledge module 40. Within the module 40 is stored, in an appropriate manner such as through use of a look up table or searchable data base configuration, information tying certain defined primitives 22 selectively operating on the service independent building blocks 24 for the generic service creation information to SLEE specific service creation information. This tying operation in the first embodiment relates the certain defined primitives 22 selectively operating on the service independent building blocks 24 to certain defined primitives 26 selectively operating on the service independent building blocks 28 for service creation information specific to a corresponding certain service logic execution environment 12. With respect to the second embodiment, the tying operation relates the certain defined primitives 22 selectively operating on the service independent building blocks 24 to certain general programming language commands for service creation information specific to a corresponding certain service logic execution environment 12. Furthermore, the tying operation for the third embodiment relates the certain defined primitives 22 selectively operating on the service independent building blocks 24 to certain specification description language commands for service creation information specific to a corresponding certain service logic execution environment 12.

Figure 2:
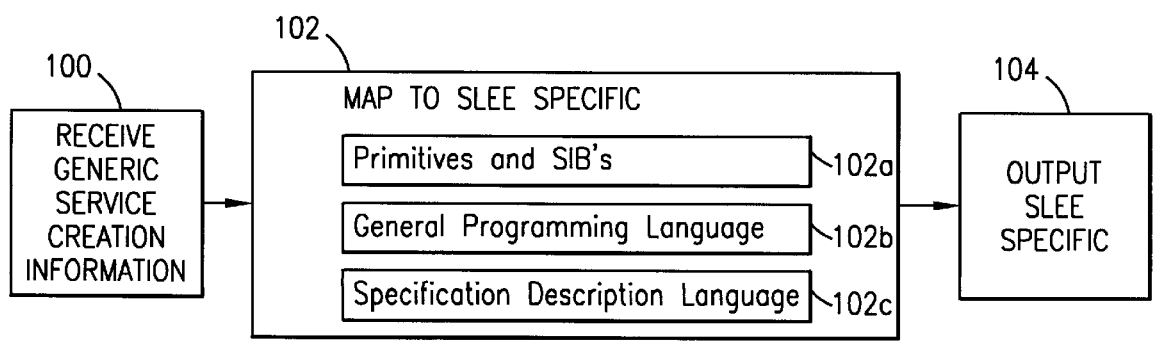
FIG. 2 is a flow diagram illustrating the mapping functionality process provided in accordance with the present invention.

Reference is now made to FIG. 2 wherein there is shown a flow diagram illustrating the mapping functionality process provided by the service execution agent in accordance with the present invention. In step 100, generic service creation information comprising certain limited defined primitives selectively operating on certain limited service independent building blocks is received from a service creation environment. This generic service creation information is then mapped into service logic execution environment specific service creation information in step 102. With respect to the first implementation, illustrated in step 102a, the mapping is made to certain defined primitives selectively operating on certain service independent building blocks. These primitives and service independent building blocks are specific to the particular service logic execution environment upon which defined service is to be executed. In connection with the second implementation, illustrated in step 102b, the mapping is made to certain general programming language commands. These general programming language commands are specific to the particular service logic execution environment upon which defined service is to be executed. For the third implementation, illustrated in step 102c, the mapping is made to certain specification description language commands. These specification description language commands are specific to the particular service logic execution environment upon which defined service is to be executed. The SLEE specific service creation information is then output in step 104 to the service logic execution environment of a service control point (or simulator) designated to execute and provide the service.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A service creation system for a communications network, comprising:

at least one service creation environment for defining a service to be implemented using service logic execution environment generic service creation information comprising a certain limited number of primitives operating on a certain limited number of service independent building blocks;

a service execution agent receiving the defined service in the generic service creation information and operating to map the limited number of primitives operating on the certain limited number of service independent building blocks into service logic execution environment specific service creation information; and a service logic execution environment specifically for whom the specific service creation information is mapped, the service logic execution environment operating to convert the service execution agent generated specific service creation information into service execution related information executable to provide the service.

2. The system as in claim 1 wherein the service logic execution environment sits in a service control point of an intelligent network through which the service is provided.

3. The system as in claim 1 wherein the mapping operation maps the limited primitives and limited service independent building blocks of the generic service creation information onto primitives and service independent building blocks specific to the service logic execution environment through which the service is provided.

4. The system as in claim 1 wherein the mapping operation maps the limited primitives and limited service independent building blocks of the generic service creation information onto general programming language commands specific to the service logic execution environment through which the service is provided.

5. The system as in claim 1 wherein the mapping operation maps the limited primitives and limited service independent building blocks of the generic service creation information onto specification description language commands specific to the service logic execution environment through which the service is provided.

6. The system as in claim 1 wherein the service execution agent comprises an abstract service machine.

7. The system as in claim 1 wherein the service execution agent comprises a shared knowledge module tying certain limited primitives selectively operating on limited service independent building blocks for the generic service creation information to service creation information specific to certain service logic execution environments.

8. A method for creating services for a telecommunications network, comprising the steps of:

generating in a service creation environment a definition of a service to be implemented using service logic execution environment generic service creation information comprising a certain limited number of primitives operating on a certain limited number of service independent building blocks;

mapping the limited number of primitives operating on the certain limited number of service independent building blocks into service logic execution environment specific service creation information; and converting, in a service logic execution environment for whom the specific service creation information is created, the specific service creation information into service execution related information executable by that service logic execution environment to provide the service.

9. The method as in claim 8 wherein the step of mapping comprises the step of mapping the limited primitives and limited service independent building blocks of the generic service creation information onto primitives and service independent building blocks specific to the service logic execution environment through which the service is provided.

10. The method as in claim 8 wherein the step of mapping comprises the step of mapping the limited primitives and limited service independent building blocks of the generic service creation information onto general programming language commands specific to the service logic execution environment through which the service is provided.

11. The method as in claim 8 wherein the step of mapping comprises the step of mapping the limited primitives and limited service independent building blocks of the generic service creation information onto specification description language commands specific to the service logic execution environment through which the service is provided.

12. The system as in claim 8 wherein the step of mapping comprises the step of tying certain limited primitives selectively operating on limited service independent building blocks for the generic service creation information to service creation information specific to certain service logic execution environments.

* * * * *